(12) United States Patent
Vorsmann et al.

(10) Patent No.: US 8,915,066 B2
(45) Date of Patent: Dec. 23, 2014

(54) DEVICE FOR EVAPORATING A UREA-WATER SOLUTION, METHOD FOR OPERATING THE DEVICE AND MOTOR VEHICLE

(75) Inventors: Christian Vorsmann, Köln (DE); Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 290 days.

(21) Appl. No.: 13/329,653

(22) Filed: Dec. 19, 2011

(65) Prior Publication Data
US 2012/0110986 A1 May 10, 2012

Related U.S. Application Data

(63) Continuation of application No. PCT/EP2010/057222, filed on May 26, 2010.

(30) Foreign Application Priority Data

Jun. 17, 2009 (DE) .......................... 10 2009 025 135

(51) Int. Cl.
*F01N 3/00* (2006.01)
*C01C 1/08* (2006.01)
*F01N 3/20* (2006.01)

(52) U.S. Cl.
CPC ............... *C01C 1/086* (2013.01); *F01N 3/2066* (2013.01); *F01N 2610/02* (2013.01); *F01N 2610/10* (2013.01)
USPC ................................. 60/295; 60/274; 60/301

(58) Field of Classification Search
USPC ............ 60/274, 285, 286, 295, 301; 392/465, 392/479, 483
See application file for complete search history.

(56) References Cited

U.S. PATENT DOCUMENTS 4,477,715 A * 10/1984 Bell et al. ....................... 219/205
6,878,359 B1 * 4/2005 Mathes et al. .............. 423/239.1
(Continued)

FOREIGN PATENT DOCUMENTS

CN            101163542 A     4/2008
DE    10 2007 058 486 A1     6/2009
(Continued)

OTHER PUBLICATIONS

Machine Translation of WO 2008/138756, Machine Translated on Nov. 21, 2013.*
Machine Translation of JP 2008-223670, Machine Translated on Nov. 25, 2013.*

(Continued)

*Primary Examiner* — Thomas Denion
*Assistant Examiner* — Patrick Maines
(74) *Attorney, Agent, or Firm* — Laurence A. Greenberg; Werner H. Stemer; Ralph E. Locher

(57) ABSTRACT

A device for evaporating a urea-water solution includes a delivery duct for the urea-water solution. The delivery duct extends through at least a first zone and a second zone for the introduction of heat energy. The zones can be heated separately from one another and, in the second zone, the delivery duct initially has a meandering course in a second inlet region, and thereafter has a rectilinear course. A method for evaporating a urea-water solution includes pre-heating the urea-water solution in the first zone to a temperature in a range from 100° C. to 150° C. and evaporating the urea-water solution in the second zone at a temperature in a range from 420° C. to 490° C. In particular, this significantly reduces the tendency for such an exhaust-gas-external evaporator for a urea-water solution to become blocked. A motor vehicle is also provided.

10 Claims, 2 Drawing Sheets

(56) References Cited

U.S. PATENT DOCUMENTS

| | | |
|---|---|---|
| 7,754,161 B2 | 7/2010 | Yamamoto |
| 8,107,799 B2 | 1/2012 | Hirth et al. |
| 8,261,537 B2 * | 9/2012 | Osbat et al. .................... 60/286 |
| 2006/0277827 A1 | 12/2006 | Yamamoto |
| 2008/0230184 A1 * | 9/2008 | Eigenberger et al. ............. 159/7 |
| 2009/0120078 A1 * | 5/2009 | Bruck et al. .................... 60/299 |
| 2009/0127511 A1 * | 5/2009 | Bruck et al. .................. 252/372 |
| 2010/0092162 A1 * | 4/2010 | Hirth et al. .................... 392/386 |
| 2011/0023470 A1 * | 2/2011 | Bruck et al. .................... 60/295 |
| 2011/0041484 A1 * | 2/2011 | Bruck et al. .................... 60/295 |
| 2011/0219756 A1 * | 9/2011 | Hodgson et al. ................ 60/301 |

FOREIGN PATENT DOCUMENTS

| | | | |
|---|---|---|---|
| JP | 2008223670 A * | 9/2008 | |
| WO | WO 2005025725 A1 * | 3/2005 | ............. B01D 53/94 |
| WO | WO 2007131784 A1 * | 11/2007 | ............. B01D 53/90 |
| WO | 2008138756 A1 | 11/2008 | |
| WO | WO 2008138756 A1 * | 11/2008 | ................ B01B 1/00 |

OTHER PUBLICATIONS

International Search Report of PCT/EP2010/057222, Dated Nov. 16, 2010.

* cited by examiner

DEVICE FOR EVAPORATING A UREA-WATER SOLUTION, METHOD FOR OPERATING THE DEVICE AND MOTOR VEHICLE

CROSS-REFERENCE TO RELATED APPLICATION

This is a continuation, under 35 U.S.C. §120, of copending International Application No. PCT/EP2010/057222, filed May 26, 2010, which designated the United States; this application also claims the priority, under 35 U.S.C. §119, of German Patent Application DE 10 2009 025 135.9, filed Jun. 17, 2009; the prior applications are herewith incorporated by reference in their entirety.

BACKGROUND OF THE INVENTION

Field of the Invention

The present invention relates to a device for evaporating a urea-water solution, that is to say, in particular, to an evaporation unit for generating a gas flow. A device of that type is used, in particular, for providing gaseous ammonia for exhaust-gas after-treatment systems in motor vehicles. The invention also relates to a method for operating the device and to a motor vehicle.

In diesel internal combustion engines, in particular, it has proven to be expedient for urea in aqueous solution to be added directly to the exhaust gas produced by the internal combustion engine, or for ammonia to be added to the exhaust gas after a hydrolysis carried out outside the exhaust gas. In that case, in known methods, use is made of a hydrolysis catalytic converter in which ammonia is obtained from the urea. The aqueous urea solution is metered into the exhaust gas upstream of a hydrolysis catalytic converter, is changed into the gaseous state and is brought into contact with the hydrolysis catalytic converter. The ammonia which is generated in that way then reacts, for example, in a so-called SCR (Selective Catalytic Reduction) catalytic converter further downstream in the exhaust system, with the nitrogen oxides contained therein to form molecular nitrogen and water.

Temperature control is particularly difficult during the evaporation of a urea-water solution. That is the case, in particular, when firstly the required quantities of the urea-water solution and secondly the available temperatures in the exhaust gas (for example in the case of a mobile application) vary significantly. If only incomplete evaporation is obtained, intermediate products may form, which can possibly lead to the evaporating unit becoming blocked. Such undesired by-products are, for example, water-insoluble biuret, which is formed from isocyanic acid and urea, and cyanuric acid, which is the trimerization product of the isocyanic acid. During the evaporation of an ammonia precursor, in particular urea-water solution, it has been observed that the introduction of temperature into the liquid must take place very quickly over a critical temperature range in order to prevent the formation of the undesired compounds, which can in part only be removed again with difficulty.

SUMMARY OF THE INVENTION

It is accordingly an object of the invention to provide a device for evaporating a urea-water solution, a method for operating the device and a motor vehicle, which overcome the hereinafore-mentioned disadvantages and at least partially solve the highlighted problems of the heretofore-known devices, methods and vehicles of this general type. It is sought, in particular, to specify a device for evaporating a urea-water solution, through the use of which the urea-water solution is evaporated quickly and as completely as possible and in which, in particular, the formation of the undesired by-products is considerably reduced. It should be possible to realize this, in particular, even under the intensely varying demands with regard to different quantities of the urea-water solution to be evaporated. Furthermore, the device should be suitable for realizing, if appropriate in addition to the evaporation, even further possibilities for the treatment of the reducing agent precursor or the conversion into ammonia.

With the foregoing and other objects in view there is provided, in accordance with the invention, a device for evaporating a urea-water solution. The device comprises a first zone and a second zone configured to be heated separately from one another, and a delivery duct for carrying the urea-water solution. The delivery duct extends through at least the first zone and the second zone for introducing heat energy and the delivery duct, in the second zone, has an initial or upstream meandering course in a second inlet region and thereafter a downstream rectilinear course.

The device is preferably a separate component which can be operated independently. For this purpose, the device may be formed, for example, in the manner of a cartridge with a separate housing.

A delivery duct for the urea-water solution is thus provided in the device. It is very particularly preferable for precisely one delivery duct to be provided through which the urea-water solution to be evaporated is conducted. It has proven to be advantageous for the evaporation of the urea-water solution, for the urea-water solution to initially be pre-conditioned to a medium temperature, for example in a temperature range above 100° C. but below 200° C., before the heat energy required for the evaporation is actually introduced. For this reason, the delivery duct extends through at least two zones in which the heat energy can be introduced into the delivery duct with different intensities and with the capability for mutually separate regulation. In this case, the transition from the first zone to the second zone, in which the evaporation ultimately takes place, has proven to be particularly critical. The differences in evaporation quality in that region arise from the fact that, in the case of a mobile application, different delivery rates in each case must be changed into the gaseous state in the evaporator. In this case, the delivery rates vary with such intensity that temperature control alone cannot permanently ensure the elimination of the undesired by-products. The delivery rates or evaporation rates of the urea-water solution amount to up to 125 ml/min [millimeters per minute] depending on requirements and engine specification. In this case, Leidenfrost effects, excessively intense local cooling and insufficient introduction of heat into the urea-water solution are only some effects which have impeded an evaporation in the case of an abrupt temperature change at the transition from the first zone to the second zone. This applies, in particular, to delivery rates of down to 15 ml/min and very particularly down to 2 ml/min.

In order to obtain a considerably improved evaporation result and to reduce the tendency of the delivery duct to become blocked during the steady-state operation, it has been found to be expedient for the delivery duct to initially have a meandering construction in the second zone, and a rectilinear construction thereafter. A meandering course or profile as used herein means, in particular, that in the inlet region of the second zone, the delivery duct extends not rectilinearly (for example along a longitudinal axis) but rather preferably has a multiplicity of coils, loops, windings or the like. As the urea-water solution flows through that region, intensive contact with the delivery duct wall and thorough mixing of the urea-water solution are attained due to the forced change in direction, and this leads to a faster and more complete evaporation.

In accordance with another feature of the invention, it is also considered to be advantageous for the delivery duct to have a meandering profile in a second outlet region in the second zone. This means, for example, that the second zone is formed with three regions, specifically an inlet region, a central region and an outlet region, wherein the delivery duct has the following profile forms directly adjoining one another in series: meandering profile, rectilinear profile, meandering profile. It is also preferable for the individual second regions to have different lengths. In particular, the second central region is constructed to be longer than the second inlet region, which in turn is preferably longer than the second outlet region. If appropriate, a separate heating element may be provided for each region, although it is also possible for a plurality of heating elements to extend over one region.

In accordance with a further feature of the invention, it has been found to be advantageous for a transition region from the first zone to the second zone of the delivery duct to be formed with an enlarged cross section. The duct cross section may, for example, lie in a range from 0.2 mm² to 30 mm², wherein the delivery duct is preferably formed in the transition region with a duct cross section of 10 mm² to 16 mm², in particular of approximately 12 mm². The capability for expansion of the urea-water solution directly upstream of the inlet into the second zone has also proven to be advantageous for the elimination of undesired by-products.

In accordance with an added feature of the invention, in the first zone, the delivery duct initially has a rectilinear profile in a first inlet region, and thereafter has a meandering profile. The first zone preferably has precisely only two regions, wherein the delivery duct merges directly from the rectilinear profile into the meandering profile. It is preferable for the first inlet region and the first outlet region to have approximately equal length, and for in each case separately operable electric heating elements to be provided.

In accordance with an additional feature of the invention, it is also considered to be advantageous for the first zone and the second zone to be connected through the use of a pipe which surrounds the delivery duct. In other words, this also means that the first zone and the second zone are preferably substantially thermally separated from one another, in such a way that the desired temperatures can be set in the first zone and in the second zone in a precise manner. In this way, it is possible in the transition region between the first zone and the second zone to attain a significant temperature step, which likewise promotes the evaporation without undesired by-products. For example, while the delivery duct is thus connected in the first zone and in the second zone to the heating elements through a heat-transmitting layer (for example an aluminum body or copper granulate), the delivery duct is formed in the transition region with a pipe which, for example, has a heat-insulating construction.

In accordance with yet another feature of the invention, the delivery duct is formed with a capillary which is disposed so as to be in heat-conducting contact with at least one electric heating element. The capillary is, for example, a separate component, in particular in the form of a small pipe or tube. Depending on what type of treatment of the urea-water solution is desired in this device, the capillary may be formed with a corresponding material and/or surface roughness. For example, if the capillary should also perform a hydrolytic function, the surface roughness may lie in a range from 4 to 20 μm [micrometers], in which case the capillary is then preferably formed with titanium. It is, however, also preferable for the delivery duct to have a low surface roughness, in particular less than 10 μm or even less than 5 μm, in the second inlet region with the meandering profile. Self-regulating heating resistors, so-called PTC resistors (PTC: Positive Temperature Coefficient) are used, in particular, as electric heating elements. This is to be understood to mean a positive temperature coefficient which allows the heat conductor to operate in a self-regulating manner about a setpoint temperature. Self-regulating heating resistors of that type are constructed, for example, from ceramic materials, such as for example barium titanate ceramics and/or doped polymers. Such self-regulating heating resistors permit simple actuation. In this case, it is preferable for the electric heating elements to not directly be in contact with the capillary or the delivery duct, but rather for a heat-transmitting layer to be provided, in which the electric heating elements and the capillary are embedded. The heat-transmitting layer includes preferably copper and/or aluminum.

With the objects of the invention in view, there is also provided a method for operating a device for evaporating a urea-water solution. The method comprises providing a device according to the invention, and operating the device by preheating the urea-water solution in the first zone to a temperature in a range from 100° C. to 180° C. and evaporating the urea-water solution in the second zone at a temperature in a range from 420° C. to 490° C.

Accordingly, an (only) two-stage heating process is proposed in this case which is distinguished by a temperature step of more than 200° C. The method is, in particular, suitable for evaporating very small amounts of urea-water solution, for example with a mean throughput of down to 10 ml/min. Precisely these rates will, however, occur consistently in the mobile application of the device, in such a way that this represents the critical load range. The structure according to the invention makes it possible for the first time to reliably avoid blockage of the delivery duct even at these low throughputs.

With the objects of the invention in view, there is concomitantly provided a motor vehicle, comprising an exhaust system having a reducing agent metering system with at least one device according to the invention, and a controller programmed to carry out a method for an intermittent metered addition of reducing agent.

Accordingly, the device is used at least for the evaporation of urea-water solution, which (if appropriate, after being brought into contact with a hydrolysis catalytic converter, as ammonia) is added to the exhaust gas in the gaseous state. Consequently, the device serves, in particular, for the evaporation (and hydrolysis) of the urea-water solution outside the exhaust gas. The ammonia (reducing agent) formed in the device or in the exhaust system permits a conversion, in the exhaust system, of undesired nitrogen oxides in the presence of a so-called SCR catalytic converter. The SCR process is known, and therefore a more detailed explanation will not be given. With regard to the execution of the method, it is also pointed out that an "intermittent" metered addition means, in particular, that no continuous flow of reducing agent to the exhaust system is obtained, but rather dosed quantities of the reducing agent or of the urea-water solution are added in each case at predefined points in time.

Other features which are considered as characteristic for the invention are set forth in the appended claims, noting that the features specified individually in the claims may be combined with one another in any desired technologically expedient manner and form further embodiments of the invention.

Although the invention is illustrated and described herein as embodied in a device for evaporating a urea-water solution, a method for operating the device and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
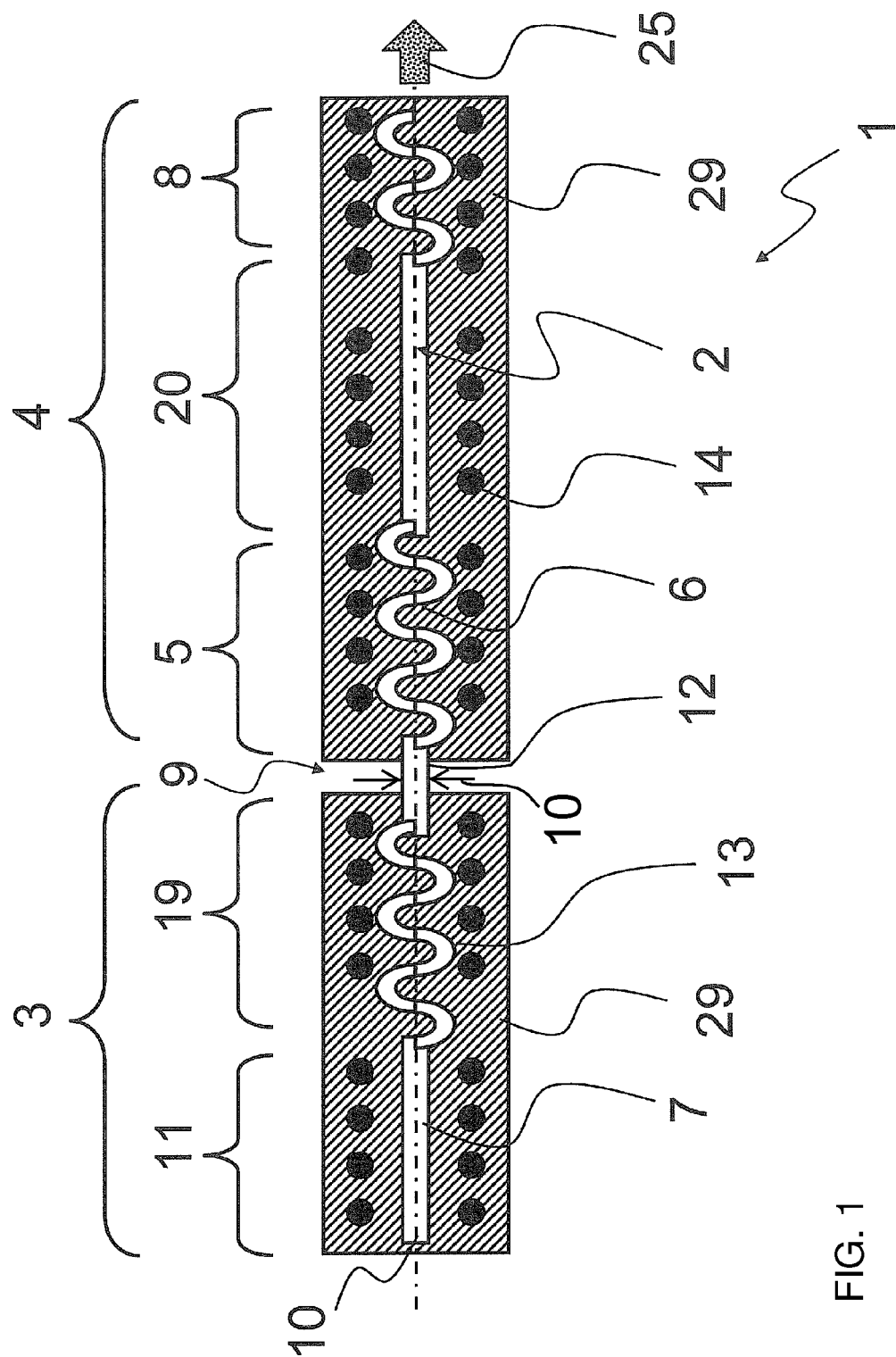
FIG. 1 is a diagrammatic, longitudinal-sectional view of a preferred structural variant of a device according to the invention.

Referring now in detail to the figures of the drawing for explaining the invention and the technical field in more detail by showing particularly preferred structural variants to which the invention is not restricted and first, particularly, to FIG. 1 thereof, there is seen a preferred embodiment of a device 1 according to the invention for the evaporation of a urea-water solution. In this case, the device 1 is constructed with two zones and five independent heating elements, wherein the first zone 3 and the second zone 4 have an asymmetric construction.

The urea-water solution to be evaporated enters into the device 1, for example at the left, through a delivery duct 2. In this case, the delivery duct 2 is formed with a rectilinear course or profile 7 in a first inlet region 11, before the delivery duct 2 merges into a meandering course or profile 6 in the region of a directly adjoining first outlet region 19. Within the first zone 3 as well as later in the second zone 4, the delivery duct 2 is formed with a capillary 13 which is embedded in a heat-transmitting layer 29 (indicated herein by hatching). Heating elements 14 are also provided in the heat-transmitting layer 29. FIG. 1 shows in this case that both the first inlet region 11 and the first outlet region 19 each have a separately regulatable heating element 14. In the structural variant shown herein, the first inlet region 11 and the first outlet region 19 have approximately the same length, with the two regions directly adjoining one another, and no further regions being provided in the first zone 3. The same temperature is set through the use of the heating elements 14, both in the first inlet region 11 as well as in the first outlet region 19, in particular in a very narrow temperature window such as, for example, 110° C. to 120° C.

After exiting the first zone 3, the pre-conditioned urea-water solution flows in a delivery direction 25 through a transition zone or region 9, wherein the delivery duct 2 is formed by a pipe 12 in this case. The delivery duct 2 has a larger cross section 10 in the transition zone 9 than in the first and second zones 3, 4. It can be clearly seen in this case that the transition region 9 is not formed with the heat-transmitting layer 29, so that in this case there is a strict temperature division between the first zone 3 and the second zone 4.

The urea-water solution proceeds from the transition region 9 and flows into the second zone 4 in the delivery direction 25. The second zone 4 is in turn formed with the separately operable heating elements 14 which are embedded in the heat-transmitting layer 29, as is the case in the delivery duct with the capillary 13. According to the invention, the urea-water solution firstly flows through a second inlet region 5, in which the delivery duct 2 has a meandering course or profile 6. Adjoining the second inlet region 5 is a second central region 20 in which the delivery duct 2 is rectilinear. Following the second central region 20 is a second outlet region 8, wherein the delivery duct 2 is again provided with a meandering profile in this case.

In the structure proposed herein, it can be seen that the first zone 3 and the second zone 4 have an uneven or asymmetrical construction. It can also be seen that the structure of the second zone 4 itself has an uneven, that is to say asymmetrical, construction, in particular with regard to the configuration of the second inlet region 5, of the second central region 20 and of the second outlet region 8. Even though the delivery duct 2 has an asymmetrical construction in the second zone 4, it is nevertheless possible for three adjacently disposed, independently operable heating elements 14 to be provided, wherein in particular a plurality of heating elements 14 act on the second central region 20. This is not a problem because substantially the same temperature (for example 440° C.-470° C.) is set through the use of all three heating elements 14.

Figure 2:
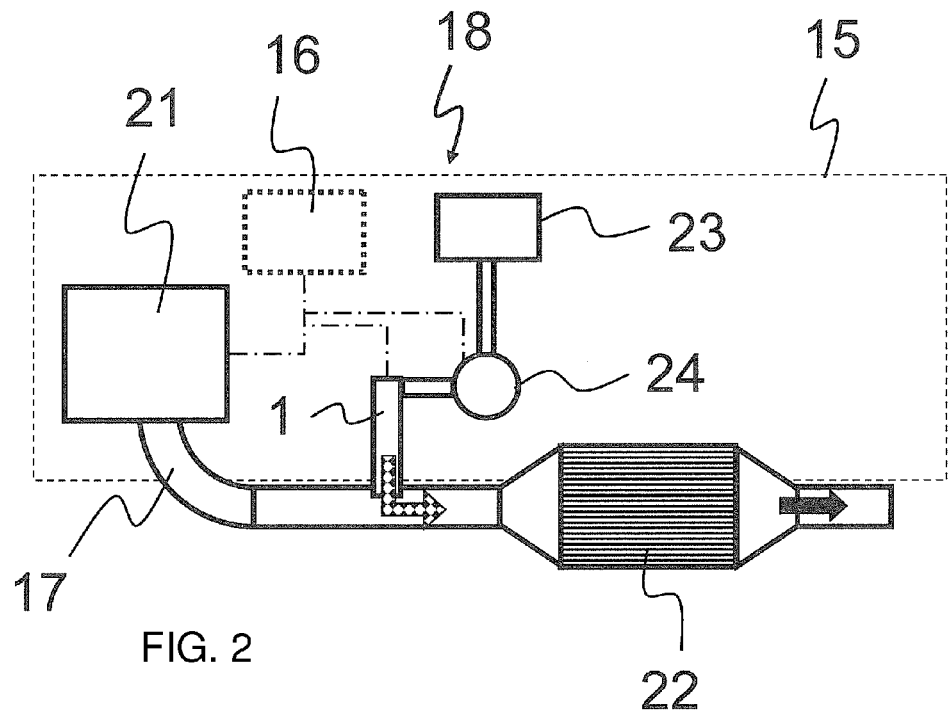
FIG. 2 is a side-elevational view of a possible example of integration of the device into a mobile exhaust system.

FIG. 2 diagrammatically shows a motor vehicle 15 having an engine 21. Exhaust gas produced in the engine 21 is discharged through an exhaust system 17 to the atmosphere. The exhaust gases are treated further in the exhaust system 17 in order to minimize the discharge of pollutants to the environment. The exhaust system 17 in FIG. 2 has a single catalytic converter 22, in particular an SCR catalytic converter. A reducing agent is supplied to the exhaust gas before it impinges upon the catalytic converter 22. In this case, the reducing agent is, for example, vaporous urea, or if hydrolysis has already taken place, vaporous ammonia. The above-described device 1 according to the invention is used, in particular, in order to inject the reducing agent. The motor vehicle 15 is therefore equipped with a reducing agent metering system 18 for the exhaust system 17 in this case. The reducing agent metering system 18 includes, for example, a tank 23 for the urea-water solution as well as a delivery unit 24 which can conduct the reducing agent to the device 1 or to the exhaust system 17, according to demand. In order to dose or meter the reducing agent according to demand, a controller 16 is also provided with which the operation of the device 1 and/or of the delivery unit 24 is realized. If appropriate for the operation, it is also possible for information regarding the operation of the engine 21 to be processed, as well as other measurement values or calculation results relating to the processes in the exhaust system.

Figure 3:
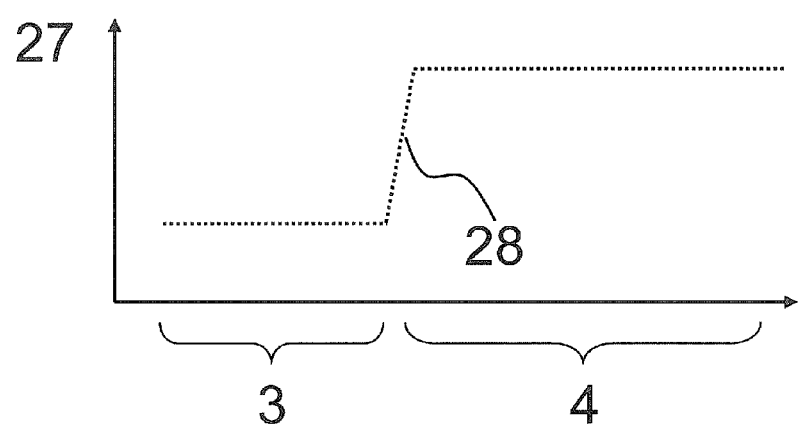
FIG. 3 is a diagram showing an introduction of temperature into a urea-water solution in a device according to the invention.

Finally, FIG. 3 is intended to illustrate that an abrupt temperature change is attained through the use of the device 1. The diagram illustrates the temperature 27 of the urea-water solution as it flows through the first zone 3 and the second zone 4. A particular characteristic of the temperature treatment is that a significant temperature step 28 is realized in the short transition region or zone 9 between the first zone 3 and the second zone 4. The formation of undesired by-products can be considerably limited in this way.

The invention is used, in particular, for the evaporation of a urea-water solution (which is also known under the trade name AdBlue) before it is brought into contact with the exhaust gas. Hydrolysis may also take place within the device, in such a way that the urea is already converted into ammonia in the device, so that the ammonia itself is added to the exhaust gas. It is, however, basically also possible for the urea vapor to be added directly to the exhaust gas, with ammonia being generated there as a result of thermolysis. Hydrolysis within the exhaust gas is also possible, in which case a corresponding catalytic converter may be used.

The invention is aimed, in particular, at the metered addition of small quantities of the reducing agent or of the urea-water solution. That has been found to result in insufficient evaporation and a high tendency toward blockage during operation, in conventional evaporation units. It is self-evident that the device is also capable of realizing greater throughputs of reducing agent such as arise in mobile applications in motor vehicles, in which they are non-critical. The device presented herein may furthermore have a very compact construction, for example in the form of a cartridge, in such a way that it can be accommodated in a space-saving manner in the exhaust system, even as a retrofit package if appropriate.

The invention claimed is:

1. A device for evaporating a urea-water solution, the device comprising:
   a first zone and a second zone configured to be heated separately from one another; and
   a delivery duct for carrying the urea-water solution;
   said delivery duct extending through at least said first zone and said second zone for introducing heat energy;
   said delivery duct, in said first zone, having an upstream rectilinear course in an inlet region and a downstream meandering course; and
   said delivery duct, in said second zone, having an upstream meandering course in an inlet region and a downstream rectilinear course;
   said meandering courses being courses where the delivery duct has a non-rectilinear shape.

2. The device according to claim 1, wherein said delivery duct, in said second zone, has a meandering course in an outlet region.

3. The device according to claim 1, which further comprises a transition zone from said first zone to said second zone, said delivery duct having a larger cross section in said transition zone than in said first and second zones.

4. The device according to claim 1, wherein, said first zone is disposed upstream of said second zone with respect to a delivery direction.

5. The device according to claim 1, which further comprises a pipe interconnecting said first zone and said second zone and surrounding said delivery duct.

6. The device according to claim 1, which further comprises at least one electric heating element, said delivery duct having a capillary disposed in heat-conducting contact with said at least one electric heating element.

7. A method for evaporating a urea- water solution, the method comprising the following steps:
   providing a device according to claim 1; and
   operating the device by preheating the urea-water solution in the first zone to a temperature in a range from 100° C. to 180° C. and evaporating the urea-water solution in the second zone at a temperature in a range from 420° C. to 490° C.

8. The method according to claim 7, which further comprises operating the device with a urea-water solution throughput of down to 10 ml/min.

9. A motor vehicle, comprising:
   an exhaust system having a reducing agent metering system with at least one device according to claim 1; and
   a controller programmed to carry out a method for an intermittent metered addition of reducing agent into said exhaust system.

10. The device according to claim 1, wherein said meandering courses are each defined by a multiplicity of coils, loops, or windings.

* * * * *